United States Patent [19]

van der Graaf

[11] Patent Number: 5,036,701

[45] Date of Patent: Aug. 6, 1991

[54] MASS-FLOW METER WITH TEMPERATURE SENSORS

[75] Inventor: Frederik van der Graaf, Zuidland, Netherlands

[73] Assignee: Bronkhorst High-Tech B.V., Ruurlo, Netherlands

[21] Appl. No.: 482,786

[22] Filed: Feb. 21, 1990

[30] Foreign Application Priority Data

Feb. 24, 1989 [NL] Netherlands .................. 8900474

[51] Int. Cl.$^5$ .............................................. G01F 1/68
[52] U.S. Cl. ............................. 73/204.12; 73/204.18
[58] Field of Search ........... 73/204.12, 204.15, 204.16, 73/204.18, 204.24, 204.25, 204.27

[56] References Cited

U.S. PATENT DOCUMENTS 2,594,618  4/1952  Booth, Jr. ..................... 73/204.12
2,896,452  7/1959  Cogniat et al. .

FOREIGN PATENT DOCUMENTS 591690  8/1947  United Kingdom ............ 73/861.12

*Primary Examiner*—Herbert Goldstein
*Attorney, Agent, or Firm*—Rosen, Dainow & Jacobs

[57]  ABSTRACT

Mass-flow meter with temperature sensors, designed for measuring mass flow rates of liquids or gases, containing a heat conductive tube, through which the mass flow to be measured occurs and of which the beginning and the end are kept at the same temperature, as well as one or more means to raise the temperature in the tube and means to measure the temperature of the mass in the tube in different places. In or on the tube one or more facilities are applied with which the zero-offset of the means to measure the temperature can be eliminated in a physical instead of an electronic way.

6 Claims, 2 Drawing Sheets

MASS-FLOW METER WITH TEMPERATURE SENSORS

The invention relates to a mass-flow meter with temperature sensors, designed for measuring mass flow rates of liquids or gases, containing a heat conductive tube, through which the mass flow to be measured occurs and of which the beginning and the end are kept at the same temperature, as well as one or more means to raise the temperature in the tube and means to measure the temperature of the mass in the tube in different places.

BACKGROUND OF INVENTION

Such a mass-flow meter is known, for instance from U.S. Pat. No. 4,100,801. The principle on which the operation of this known mass-flow meter is based is as follows. The gas or liqid (the medium) of which the mass flow rate is to be measured, flows through a metal, heat conductive tube, of which the beginning and the end are kept at the same temperature. In the middle of the tube, inside or outside, a heating element is put, with which the medium and the tube are heated. On both sides of the heating element, temperature sensors are put, symmetrical in relation to this element.

When the medium in the tube does not flow, such a temperature profile occurs, when heated by the heating element, that in the middle of the heatiang element the temperature is at its maximum. Without heat loss to the environment, the tube temperature decrease is linear, as a function of the distance to the middle mentioned. Without heat loss, or with a heat loss to the environment which is symmetrical in relation to the middle mentioned, the temperature profile along the tube is symmetrical in relation to the middle mentioned.

The temperature sensors, placed symmetrically in relation to the heating element, in case of heating an immobile medium, show, in theory, a temperature difference equal to zero.

When the medium in the tube does flow, when heating in the way mentioned above takes place, a sensor upstream from the heating element will show a lower temperature than sensor which is placed symmetrically in relation to the first, downstream from the heating element. The difference in the temperature measured by both sensors is a measure for the speed of flow of the medium and therefore for the mass flow through the tube.

The mass-flow meter with temperature sensors, according to the principle mentioned above, shows a number of disadvantages.

Air currents on the outside of the tube can disturb the temperature profile along the tube wall, and thus can have a negative influence on the accuracy and reproduceability of a measurement. The phenomenon of air currents leading to a changed temperature profile is called external convection. External convection can be counteracted by isolating the tube thermally, for instance by wrapping it in a synthetic foam.

Another disadvantage is the internal convection, occuring in the form of gravity-induced convection flows in the medium itself, which can occur when the parts of the tube on both sides of the heating element cannot be oriented symmetrically in relation to the direction of gravity. Internal convection also provides cause for additional temperature gradients along the tube surface, and thus for extra inaccuracy in measuring the mass flow. This problem, which occurs especially when the mass-flow meter with temperature sensors is applied in spacecraft, can be counteracted by putting a loop course in the tube, because of which the medium is forced to turn around the flow direction at least once. A description of a mass-flow meter with loop-shaped tube is given in the mentioned U.S. Pat. No. 4,100,801.

Internal convection as well as external convection are manifest in the occurrence of so-called zero-offset, by which is meant the phenomenon that when the tube, with an immobile medium, is heated, in variance with that which one would expect from theory, temperature sensors applied symmetrically in relation to the heating element show a temperature difference not equal to zero. Internal and external convection are not the only causes for the occurrence of a zero-offset.

Other causes for the occurrence of a zero-offset are, among others, a difference in the temperature at the beginning and end of the tube, with an otherwise exact symmetry of the temperature sensors in relation to the heating element, a positioning of the temperature sensors not exactly symmetrical in relation to the middle of the tube, a positioning of the heating element not exactly in the middle of the tube and inhomogeneities in the tube wall.

In the known embodiments of the mass-flow meter with temperature sensors, the problem of occurring zero-offset is avoided by compensating for the zero-offset electronically. The disadvantage of this is the inherent need for cost-raising additional electronic equipment and/or components for reading the temperature sensors.

SUMMARY OF INVENTION

Purpose of the present invention is to provide a mass-flow meter with which the so-called zero-offset can be eliminated physically. This purpose is achieved, according to the invention, by applying one or more facilities in or on the tube, with which the temperature profile along the tube can be regulated so, that when the tube, with an immobile medium, is heated, temperature sensors placed symmetrically in relation to the heating element show a temperature difference equal to zero.

These facilities can either consist of additional heating elements with which the temperature at the beginning or the end of the tube can be set, or consist of one or more cooling bodies (so-called Peltier-elements) or consist of a mechanical construction against the tube wall with which the effect of a lengthwise varying wall thickness can be simulated. An example of such a mechanical construction is a rail against the tube wall, along which a metal heat conductor can be moved and fixed.

In a preferred embodiment of a mass-flow meter according to the invention, the facility that regulates the temperature profile along the tube consists of a heating element in the middle of the tube, which element consists of two parts, to be steered separately, which parts are located respectively on both sides of the middle, downstream and upstream, in other words a heating element that is doubly constructed. By using a doubly constructed heating element in the middle of the tube, instead of a single heating element, the strict construction-technical requirement of very accurate positioning of the heating element in the middle of the tube, does not have to be met. Applying a double heating element also hardly raises the cost compared to a single heating element, because the latter mostly consists of a resistance coil, wound around the tube, whereas in order to make a double heating element, one only has to supply the mentioned resistance coil with an additional power supply wire.

A double constructed heating element in mass-flow meters according to the invention distinguishes itself from earlier applied doubly constructed heating elements in mass-flow meters, of which the functioning is based on a circuit in which the heating elements also function as temperature sensors, because for both functions the same temperature-sensitive resistance coils are used, as described in the U.S. Pat. No. 4,487,062, just because with mass-flow meters according to the type described there, the possibility to compensate for the zero-offset physically with the doubly constructed heating element, is absent. Another distinction between a doubly constructed heating element in a mass-flow meter according to the invention and the type described in the U.S. Pat. No. 4,487,062, is caused by the position and the construction of the heating element. A doubly constructed heating element according to the invention should be placed, because of the measuring principle, in or very near the middle of the tube, whereas with the type according to the American patent, positioning at a substantial distance from the middle of the tube is a necessary condition for the functioning of the otherwise basically different measuring principle.

The sensitivity of a mass-flow meter according to the invention is determined by the sensitivity of the temperature sensors, for which in known mass-flow meters temperature-dependent resistance wire is used. The more heat is dissipated through the heating element, the greater the temperature difference measured by the temperature sensors becomes, and therefore the sensitivity of the mass-flow meter.

The mass-flow meters used in practice are sometimes dimensioned so that the temperature induced by the heating element in the middle of the tube can rise to more than 100° C. above the environmental temperature. This can cause the following disadvantages. Volatile liquids can start boiling, which renders a measurement impossible. Some liquids and gases can dissociate with a temperature rise as great as the one mentioned. The measuring accuracy can be influenced in a negative way when the specific heat of the medium to be measured is strongly temperature dependent. With very low flow rates, as a result of the expansion of the medium, a flow occurs, the so-called thermosyphon-effect. If the order of magnitude of this flow equals that of the mass flow to be measured, the measuring error becomes unacceptably great. Elimination of all these disadvantages is only possible by drastically lowering the temperature induced by the heating element in the medium, and therefore a lowering of the temperature difference measured by the temperature sensors.

The practical possibilities of a mass-flow meter which is equipped, according to the invention, with a doubly constructed heating element in the middle of the tube are notably widened when the temperature sensors consist of thermocouples or, more specific, a thermopile. A thermopile consists of a great number of thermocouples, in serial connection, which are wound around a holder in such a way, that all 'hot' sides of the thermocouples are located on one side of the holder, and all 'cold' sides of the thermocouples are located on the other side of the holder.

When, instead of temperature dependent resistance wire, thermocouples are used as temperature sensors, a much smaller temperature rise of the medium in the middle of the tube will suffice, a sufficient linearity of the sensor signal at an ample range of mass flow rate values is realised, sufficient sensitivity of the temperature sensors is obtained, and the sensibility for the influence of the temperature of the environment of the tube is at an acceptable low level.

The advantages of a thermopile are still enlarged when the temperature of the tube downstream of the heating element, placed in the middle, is measured with the hot side of the pile, and the temperature of the tube upstream is measured with the cold side of the pile. Such a sensor configuration is possible with an U-shaped tube, with which the doubly constructed heating element is put on the tube in the middle of the curve of the U-shape, and of which the distance between both legs is just equal to the distance between the hot and the cold part of the thermopile, so that the thermopile can be clasped between both legs of the U-shaped tube.

In an example of a mass-flow meter according to the invention, with U-shaped tube, doubly constructed heating element and thermopile, the applied thermopile has the characteristic that the cold and hot sides are about 2.5 mm apart. Both legs of the U-shaped tube run parallel, with an in-between distance of about 2.5 mm. Between the legs, a thermopile is put along the total length or a part thereof. With this configuration, the temperature difference between two points of the tube, in a symmetrical position upstream and downstream in relation to the heating element put in the middle of the tube, is measured again and again. All measured temperature differences are, inherent in the use of a thermopile, summed, with which the highest possible signal is obtained. The beginning and end of the tube, both 'feet', are constructed of a solid piece of metal, with the purpose of keeping the temperatures at the beginning and end of the tube the same, as well as possible. The solid piece of metal mentioned is thermally coupled tightly to a metal box which makes up the casing of the isolation. With this, one achieves that the temperatures of the beginning and end of the tube are equalised with the outside temperature as well as possible. Both legs of the U-shaped tube are assembled symmetrically within the metal box, the rest of the space within is filled with isolating material. In the upper part of the legs, symmetrically around the top, a doubly constructed heating element is put.

SUMMARY OF DRAWINGS

The invention will now be explained further with the help of a drawing in which.

DETAILED DESCRIPTION OF PREFERRED EMBODIMENTS

Figure 1:
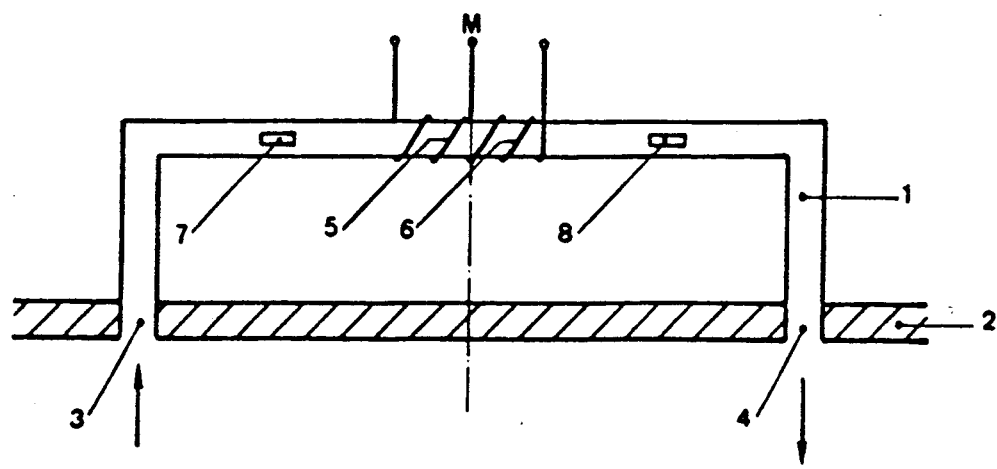
FIG. 1 shows a diagram of the mass-flow meter according to the invention.

FIG. 1 shows the metal heat-conductive U-shaped tube 1, through which the liquid or gaseous medium to be measured flows, and the metal casing 2 of the mass-flow meter. Beginning 3 and end 4 of the tube, the 'feet', are thermally coupled to the metal casing 2. Around the middle M of the tube, a doubly constructed heating element is put in the shape of a resistance wire, wound about the tube, with three connection points for power supply, so that the left and right part, respectively 5 and 6 of the heating element, can be steered separately. The temperature of the outside of the tube is measured, upstream and downstream, by two temperature sensors 7 respectively 8, which are symmetrical in relation to the middle M. The arrows in beginning and end of the tube show the direction of the flow of the medium.

Figure 2:
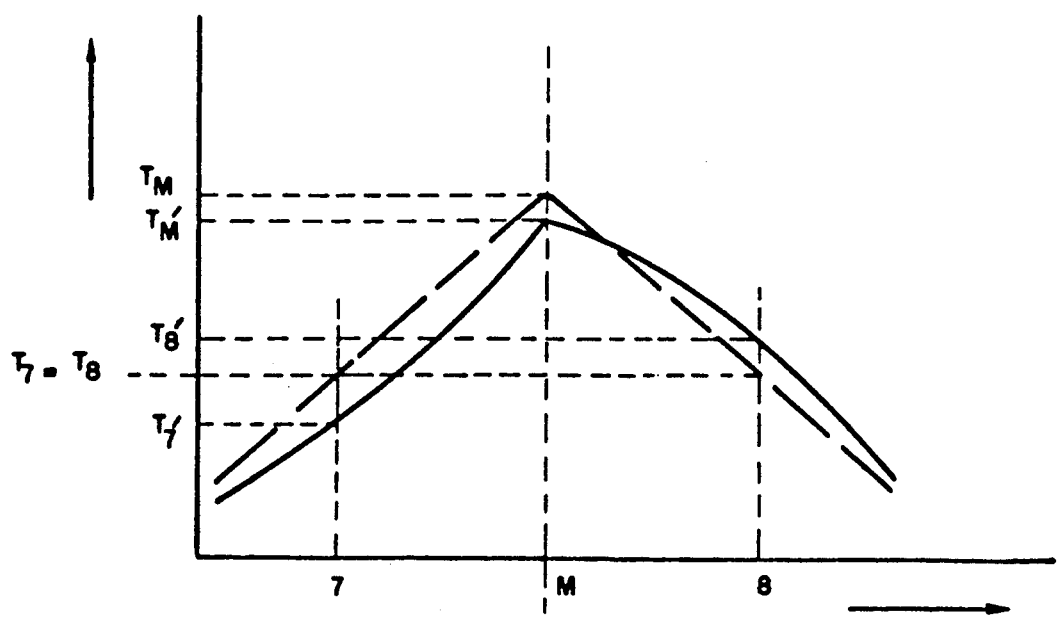
FIG. 2 shows a graphical representation of the ideal course of the temperature of the medium in the tube in FIG. 1, for the situation in which the medium is immobile as well as the situation in which it flows.

When the medium does not flow and there are no heat losses of the medium to the environment, then, when heated in point M, in the theoretically ideal situation, a temperature profile arises in the tube wall, as shown by the dashed, straight lines in FIG. 2. When sensors 7 and 8 are put in exactly symmetrical positions, the temperature in both places will be the same.

When the medium flows, under otherwise similar (ideal) circumstances, the temperature profile in the tube wall will develop in accordance with the unbroken curve in FIG. 2. In simple and well-known way, one can deduce that the speed of flow of the medium is proportional with the temperature difference $T'8 - T'7$.

Figure 3:
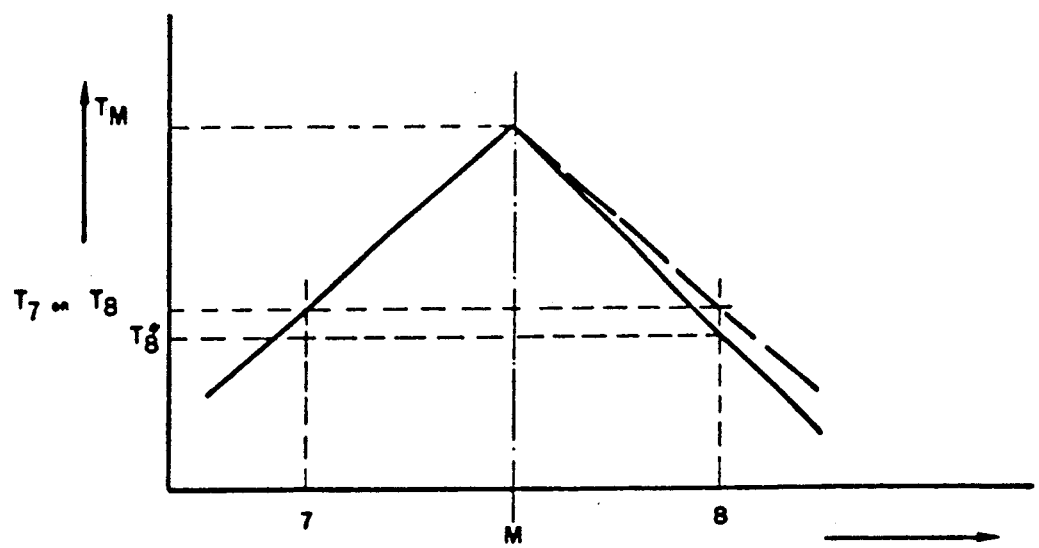
FIG. 3 shows a graphical representation of a possible course of the temperature of the medium in the tube in FIG. 1 in case the medium is immobile and the situation is not in accordance with the theoretical ideal.

In FIG. 3 the temperature profile, in solid lines, in the tube wall is drawn for an immobile medium in case for whatever reason the temperature at the end of the tube 4 is lower than at the beginning 3, or that the right leg would be or seem shorter than the left (for instance if the heating element is not put exactly in the middle). It is obvious that in this situation, the temperatures at the sensors 7 and 8 are no longer the same, but a so-called zero-offset $T'7 - T''8$ has occurred. This zero-offset influences the accuracy of the measuring in an unacceptably negative way.

By dissipating more heat in the right part 6 of the doubly executed heating element than in the left part 5, one can recover the ideal temperature profile (left part unchanged, right part dashed line in FIG. 3) and thus eliminate the zero-offset $T'7 - T''8$. One can easily see that other non-ideal temperature profiles than the one from the example in FIG. 3 can also be corrected in the same simple way, with the help of the doubly constructed heating element.

Figure 4:
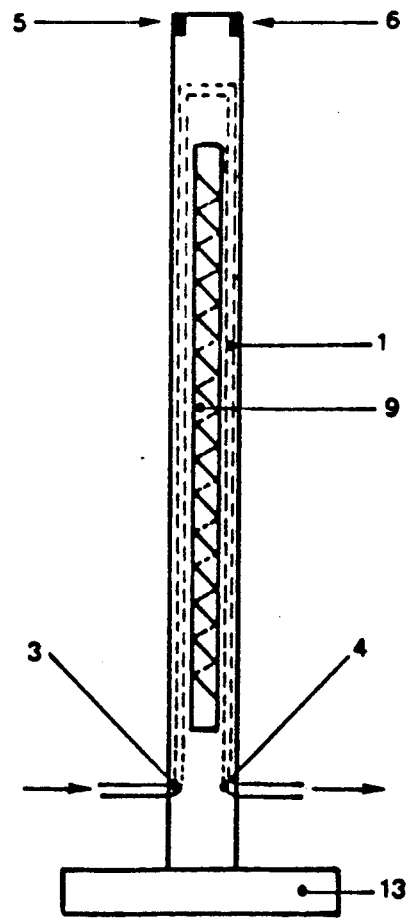
FIG. 4 is a side view of a preferred embodiment of a mass-flow meter with U-shaped tube, doubly constructed heating element and thermopile.

FIG. 4 shows an example of a mass-flow meter according to the invention with U-shaped aluminum tube 1 and a doubly constructed heating element with parts 5 and 6 in a side view. Between the legs of the tube, a thermopile 9 is put along the total length or a part thereof. With this configuration, each time the temperature difference is measured between two points of the tube, in a symmetrical position, upstream and downstream, in relation to the heating element put in the middle of the tube. All measured temperature differences are, inherent in the use of a thermopile, summed, with which the highest possible signal is obtained. The beginning 3 and end 4 of the tube, both 'feet' are constructed of a solid piece of aluminum, with the purpose of keeping the temperatures at the beginning and end of the tube the same, as well as possible. The solid piece of aluminium mentioned is thermally coupled tightly to an aluminum box (of which only the bottom 13 is shown in the Figure) which makes up the casing of the isolation. With this, one achieves that the temperatures at the beginning and end of the tube are equalised with the outside temperature as well as possible. Both legs of the U-shaped tube are assembled symmetrically within the metal box, the rest of the space within is filled with isolating material. In the upper part of the legs, symmetrically around the top, a doubly constructed heating element, with parts 5 and 6, is put.

I claim:

1. A mass-flow meter with temperature sensors adapted for measuring mass flow rates of liquids or gases, having:
   (a) a heat conductive tube through which the mass flow to be measured occurs and of which the beginning and the end are kept at the same temperature,
   (b) means to raise the temperature in the tube,
   (c) means to measure the temperature of the mass in the tube at different places including a plurality of temperature sensors placed symmetrically in relation to the temperature-raising means, characterized in that
   (d) said means to raise the temperature including electrically-responsive means fixed to the tube for modifying the temperature profile along the tube such that when the tube with an immobile mass is heated
   said temperature sensors show a temperature difference equal to zero.

2. A mass-flow meter according to claim 1, characterized in that the electrically-responsive means comprises a heating element in the middle of the tube, said heating element comprising two parts to be controlled separately, said parts being located respectively downstream and upstream of the middle.

3. A mass-flow meter according to claim 2, characterized in that the temperature measuring means comprise thermocouples having a hot and a cold part.

4. A mass-flow meter according to claim 3, characterized in that the heat conductive tube is U-shaped, the heating element is mounted around the tube, approximately at the middle of the curve of the U-shaped, the distance between both legs of the U is just equal to the distance between the hot and cold parts of the thermocouples, the thermocouples being clasped between both legs of the U-shaped tube.

5. A mass-flow meter according to claim 3, characterized in that the hot and cold sides of the thermocouples are about 2.5 mm apart.

6. A mass-flow meter according to claim 1, characterized in that said electrically-responsive means comprise adjacent heating coils with a center tap.

* * * * *